US008402162B2

(12) United States Patent
Iwaki et al.

(10) Patent No.: US 8,402,162 B2
(45) Date of Patent: Mar. 19, 2013

(54) NETWORK SYSTEM THAT CAN EASILY REMOTELY ACCESS OTHER NETWORKS

(75) Inventors: Mitsuzo Iwaki, Osaka (JP); Tomonari Yoshimura, Kyoto (JP); Masakazu Murakami, Itami (JP); Okihisa Yoshida, Amagasaki (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1280 days.

(21) Appl. No.: 11/892,527

(22) Filed: Aug. 23, 2007

(65) Prior Publication Data
US 2008/0052411 A1 Feb. 28, 2008

(30) Foreign Application Priority Data

Aug. 24, 2006 (JP) ................. 2006-227340

(51) Int. Cl.
*G06F 15/173* (2006.01)
(52) U.S. Cl. ...................................... 709/238
(58) Field of Classification Search .............. 709/226
See application file for complete search history.

(56) References Cited

U.S. PATENT DOCUMENTS

| 2002/0026531 | A1* | 2/2002 | Keane et al. ............... 709/250 |
| 2003/0172184 | A1* | 9/2003 | Kong ........................... 709/245 |
| 2005/0012953 | A1* | 1/2005 | Fujishige et al. ............ 358/1.13 |
| 2005/0128975 | A1* | 6/2005 | Kobayashi et al. .......... 370/328 |

FOREIGN PATENT DOCUMENTS

| EP | 1 950 918 | 7/2008 |
| JP | 11-068842 | 3/1999 |
| JP | 11-261704 A | 9/1999 |

(Continued)

OTHER PUBLICATIONS

Hiroaki Hata, "An Implementation of IP-VPN by Using Proxy Mobile IP" IEICE Technical Report, Japan, The Institute of Electronics, Information and Communication Engineers, vol. 105, No. 278, Sep. 8, 2005, pp. 87-90, with English Translation thereof.

(Continued)

*Primary Examiner* — Scott Christensen
(74) *Attorney, Agent, or Firm* — Buchanan Ingersoll & Rooney PC (57) ABSTRACT

A network system that can easily carry out remote access of a different network. The network system comprises a first image processing apparatus connected to a first network and a second image processing apparatus connected to a second network having a network address different from that of the first network. The first image processing apparatus includes a first network interface connected to the first network; a second network interface that can build a third network, that is different from the first and second networks, between it and a terminal that is normally connected to the second network and in which the first IP address in the second network is set; an IP header editing unit that performs processing such that the address of the IP packets sent from the terminal via the third network is the IP address of the second image processing apparatus; and a packet transmission unit that sends the IP packets processed by the IP header editing unit to a network via the first network interface, and the second image processing apparatus includes a response header editing unit that performs processing to make the first network interface the destination for responses to IP packets sent by the terminal via the first image processing apparatus.

16 Claims, 9 Drawing Sheets

FOREIGN PATENT DOCUMENTS

| | | |
|---|---|---|
| JP | 2002-064567 | 2/2002 |
| JP | 2004-356822 | 12/2004 |
| JP | 2005-149337 A | 6/2005 |
| JP | 2005-204289 | 7/2005 |
| JP | 2006-101344 | 4/2006 |
| JP | 2007-142648 | 6/2007 |

OTHER PUBLICATIONS

Notification of Reason for Refusal in JP 2006-227340 dated Sep. 9, 2008, with English Translation thereof.

* cited by examiner

| USER ID | HOME MFP IP ADDRESS | CORRESPONDING TERMINAL |
|---|---|---|
| DAVID | 152.17.92.1 | PC202 |
| MICHAEL | 152.17.92.1 | PC203 |
| ⋮ | ⋮ | ⋮ |

| IP ADDRESS OF TRANSMISSION SOURCE OF PACKETS IN WHICH REMOTE LOCATION FLAG IS SET | IP ADDRESS OF DESTINATION OF RESPONSES TO PACKETS IN WHICH REMOTE LOCATION FLAG IS SET |
|---|---|
| (152.17.92.2) | (60.121.116.1) |

NETWORK SYSTEM THAT CAN EASILY REMOTELY ACCESS OTHER NETWORKS

This application is based on Japanese Patent Application No. 2006-227340 filed in Japan on Aug. 24, 2006, the entire content of which is hereby incorporated by reference.

BACKGROUND OF THE INVENTION

1. Field of the Invention

The present invention relates to a network system comprising multiple image processing apparatuses and to an image processing apparatus and program that comprise this network system.

2. Description of the Related Art

As a technology used in order to access an internal company LAN from a remote location, such as during a business trip, a technology called IPsec-DHCP has been proposed (see RFC 3456, for example). Using this technology, when a terminal is to be connected to a remote-location LAN, in addition to an IP address for use in accessing the remote LAN is assigned via DHCP (Dynamic Host Configuration Protocol), an IP address used for remotely accessing the company intranet is assigned by the company's DHCP server. When the company intranet is to be remotely accessed, access is carried out using the IP address assigned for that remote access.

When the above technology is utilized, the supporting software (IPsec client software) must be newly installed on the terminal taken on the business trip. As a result, a technology that enables other networks to be easily remotely accessed without having to install new software on the terminal has been desired.

SUMMARY OF THE INVENTION

An object of the present invention is to provide an improved network system or the like that eliminates the problems described above.

A further object of the present invention is to provide a network system or the like that enables easy remote access of other networks without the need to install new software on the terminal.

The above objects are achieved by providing the network system described below:

A network system comprising a first image processing apparatus connected to a first network and a second image processing apparatus connected to a second network having a network address different from that of the first network, wherein the first image processing apparatus includes:

a first network interface connected to the first network;

a second network interface that can build a third network, that is different from the first and second networks, between it and a terminal that is normally connected to the second network and in which the first IP address in the second network is set;

an IP address setting unit that sets in the second network interface a second IP address that is different from the first IP address;

an IP header editing unit that performs processing to make the destination of the IP packets sent from the terminal via the third network the IP address of the second image processing apparatus; and a packet transmission unit that sends the IP packets processed by the IP header editing unit to a network via the first network interface, and the second image processing apparatus includes a response header editing unit that performs processing to make the first network interface the destination for responses to IP packets sent by the terminal via the first image processing apparatus.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Embodiments of the present invention will be described below with reference to drawings.

Embodiment 1

(1) Network System Construction

Figure 1:
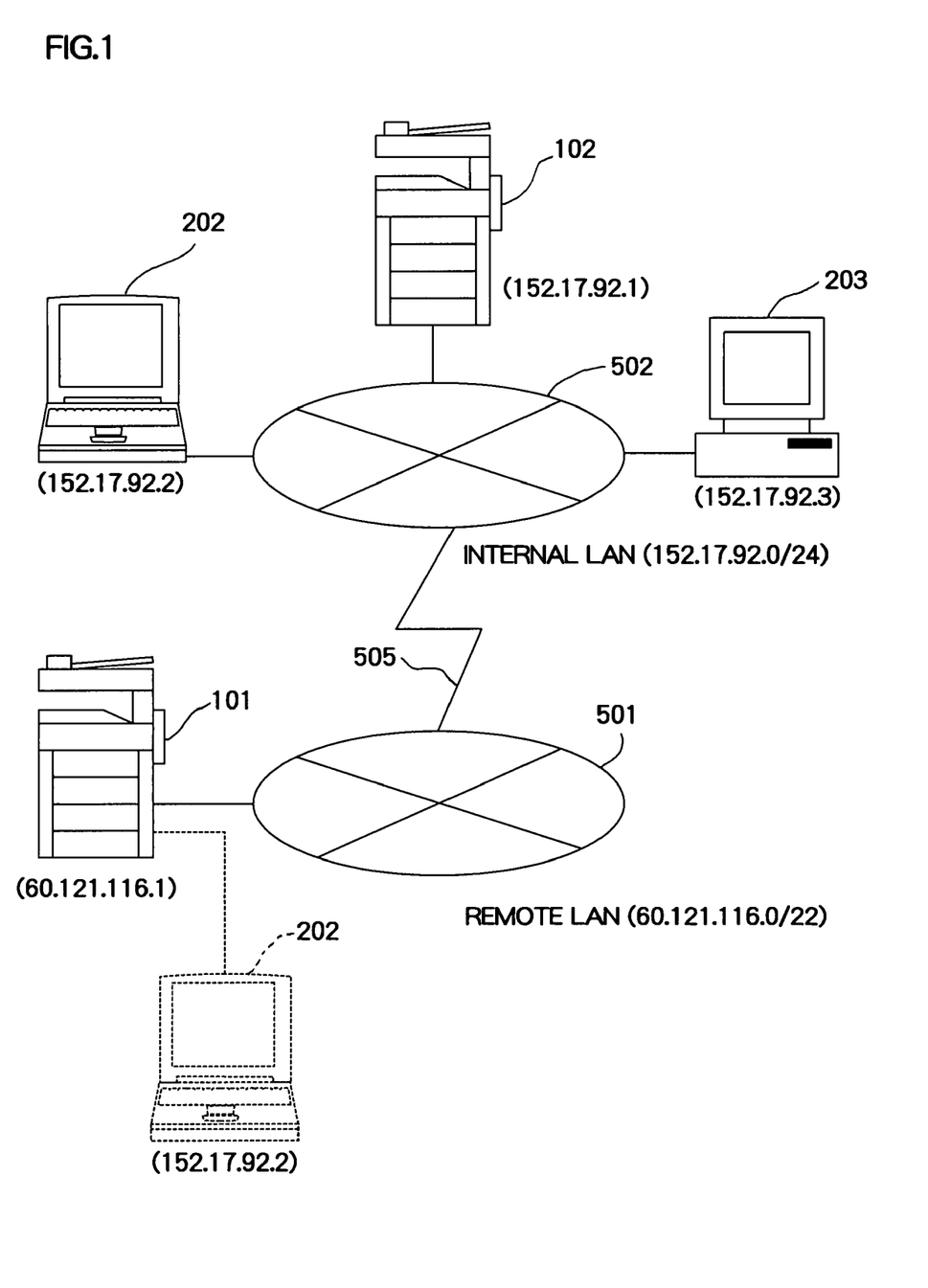
FIG. 1 is a drawing showing the overall construction of the network system of an embodiment of the present invention.

FIG. 1 is a drawing to explain an example of the overall construction of a network system of an embodiment [of the present invention]. In the network system of the embodiment, LANs 501 and 502 having different network addresses are connected over a WAN (Wide Area Network) 505 comprising the Internet, dedicated communication lines or the like.

Shown around the various terminals and the like in FIG. 1 are examples of IP addresses and network addresses set in the terminals. These addresses are provided solely for explanatory purposes, and have no relationship to the actual addresses. In the embodiment, these addresses are not assigned via DHCP, but are rather fixed for each terminal.

In the embodiment, let us suppose that the LAN 502 is an internal LAN, for example, while the LAN 501 is a LAN at a remote location, such as the location of a business partner. In the discussion below, the LAN 501 will be termed a 'remote LAN,' while the LAN 502 will be termed an 'internal LAN.' Ordinarily, an MFP (Multifunction Peripheral) 102 comprising an example of an image processing apparatus and terminals 202, 203 are connected to the internal LAN 502. The MFP is an image forming apparatus that incorporates such functions as copy, network printing, scanner, fax and document server functions. It is also called a 'multifunction device.'

An MFP 101 is connected to the remote LAN 501. In the embodiment, when a user who brings the terminal 202 to the remote location is to access the internal LAN 502, the user connects the terminal 202 to the MFP 101 connected to the remote LAN 501. The terminal 202 is hereinafter termed the 'guest PC'. A VPN (Virtual Private Network) may be constructed between the remote LAN 501 and the internal LAN 502. In the embodiment, PCs are used as the terminals 202, 203, but mobile devices (PDAs) or networkable cell phones that can connect to LANs, for example, may be used as well.

(2) Construction of MFP 101

Figure 2:
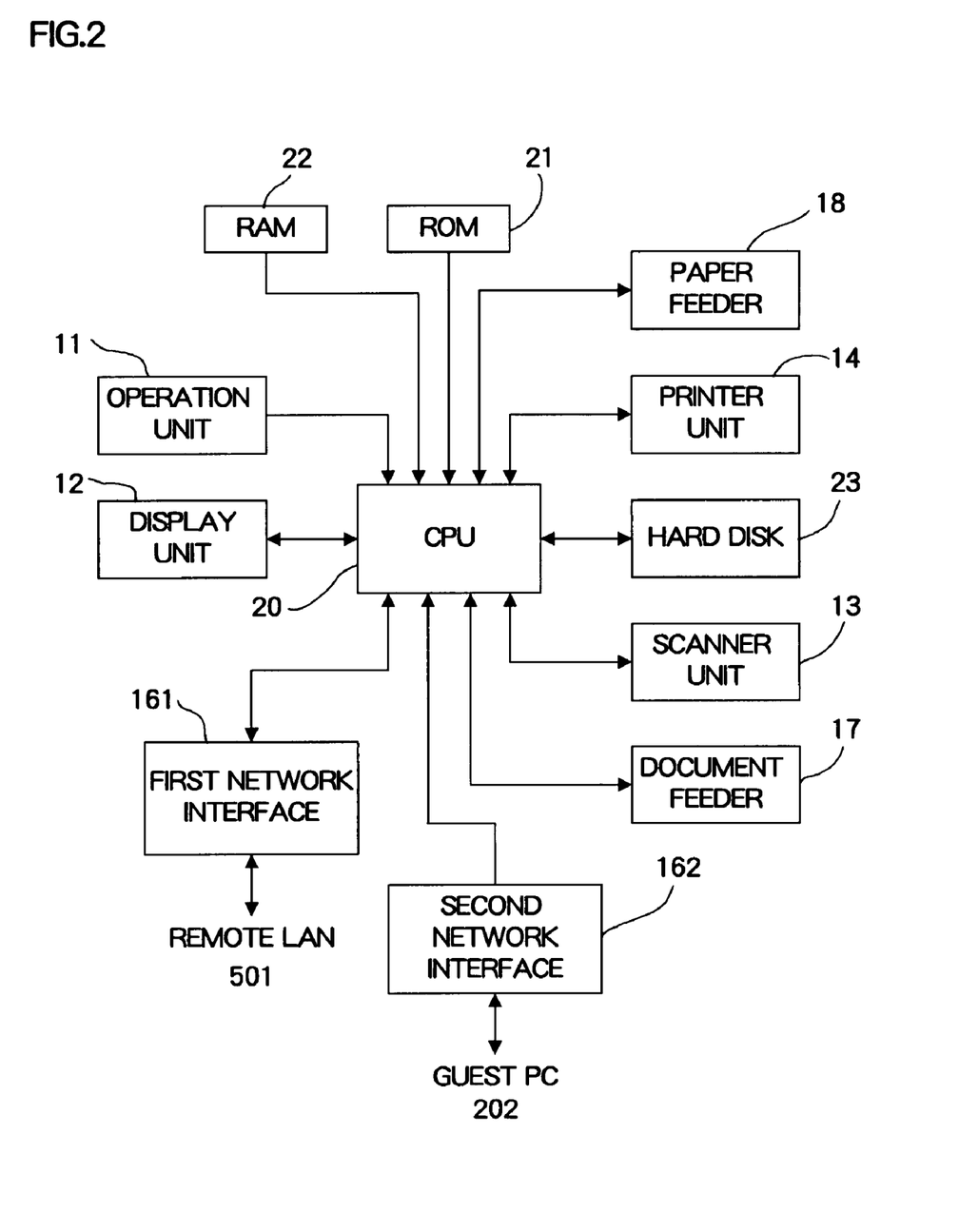
FIG. 2 is a block diagram showing the hardware construction of an MFP comprising one type of image processing apparatus.

The construction of the MFP 101 connected to the remote LAN 501 will now be described. FIG. 2 is a block diagram to describe an example of the hardware construction of the MFP 101.

The MFP 101 comprises such elements as an operation unit 11, a display unit 12, a scanner unit 13, a printer unit 14, a first network interface 161, a second network interface 162, a document feeder 17, a paper feeder 18, a CPU 20, a ROM 21, a RAM 22 and a hard disk 23.

The operation unit 11 comprises such components as multiple keys used to input numbers, letters, symbols and the like, a sensor that recognizes pressed keys, and a transmission circuit that transmits signals indicating recognized keys to the CPU 20.

The display unit 12 displays screens showing messages to the user, screens used by the user to input settings or the type of processing, and screens showing the results of processing executed by the MFP 101. In the embodiment, a touch panel is used as the display unit 12. This touch panel includes a function to detect the position on the touch panel touched by the user's finger and a function to send signals indicating the detection results to the CPU 20, and is incorporated in the operation unit 11.

The scanner unit 13 reads images drawn on an original document at a prescribed read resolution by detecting reflected light from an exposed original document and generates digital image data (here, density data expressed in terms of the density of RGB or black). The image data obtained in this fashion is used for printing by the printer unit 14 and/or is stored on the hard disk 23 after conversion to a file in the TIFF, PDF, JPEG or other format. The image may also be converted into fax data for use in a fax transmission, but the fax function of the embodiment will not be explained herein. The document feeder 17 is disposed at the top of the main unit of the MFP 101, and is used for sequential feeding of a one-page or multi-page original document to the scanner unit 13.

The printer unit 14 prints images read by the scanner unit 13, images of data transmitted from an external device such as a personal computer (PC) connected via the remote LAN 501, or images of fax data received via fax to a recording sheet such as paper or film. The paper feeder 18 is disposed in the lower part of the MFP 101 main unit, and is used to supply to the printer unit 14 recording sheets that are suitable for the images to be printed. The recording sheets on which images are printed by the printer unit 14 are ejected onto a paper eject tray.

The first network interface 161 is a network interface used for connection to the remote LAN 501. The first network interface 161 may comprise a NIC (Network Interface Card), for example. The second network interface 162 is a network interface to which the guest PC 202 brought to the remote location is connected. In the embodiment, the guest PC 202 and the second network interface 162 are connected via a crossover cable used for connection over a LAN, and a one-to-one network (LAN) is built between the second network interface 162 and the PC 202.

Programs and data used to implement the basic functions of the MFP 101, such as image reading (scanning), original document reproduction (copying), fax data transmission and receipt, network printing and document server services (box function) are stored in the ROM 21. Some or all of these programs and data may be installed on the hard disk 23. In this case, the programs or data installed on the hard disk 23 is loaded into the RAM 22 when necessary. Files containing image data obtained via reading of an original document by the scanner unit 13 and files containing image data transmitted from an external device, for example, are stored on the hard disk 23.

Figure 3:
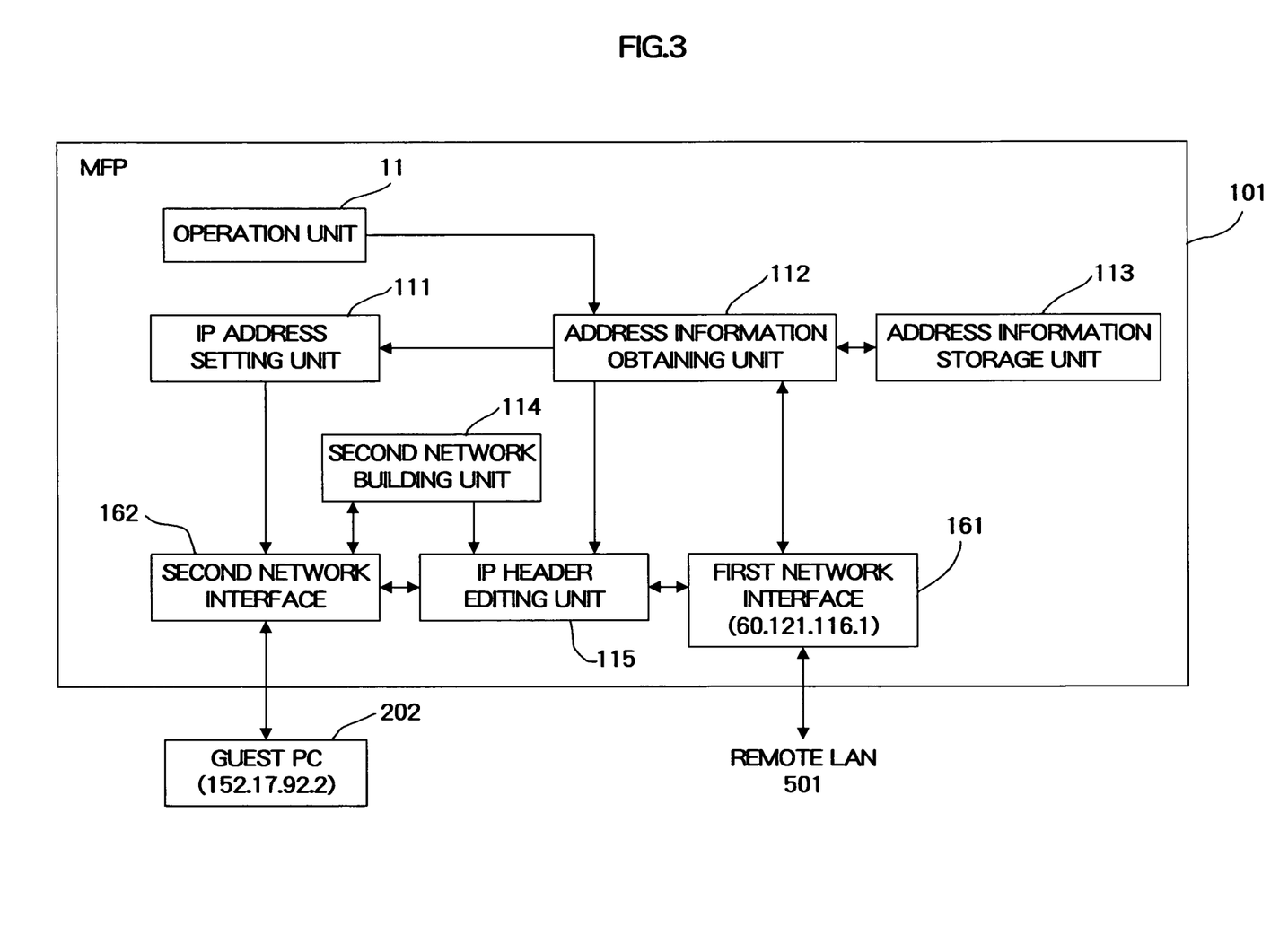
FIG. 3 is a function block diagram showing the construction of a network system of the embodiment.

FIG. 3 is a function block diagram to explain the construction within the MFP 101 that implements the network system of the embodiment. The MFP 101 includes an IP address setting unit 111, an address information obtaining unit 112, an address information storage unit 113, a second network building unit 114 and an IP header editing unit 115. The functions of the IP address setting unit 111, address information obtaining unit 112, second network building unit 114 and IP header editing unit 115 are implemented via the execution of programs stored in the ROM 21 by the CPU 20.

The IP address setting unit 111 sets an IP address in the second network interface 162. This set IP address is an IP address used to build a second network linking to the guest PC 202 that is different from the remote LAN 501 (a one-to-one network between the second network interface 162 and the guest PC 202).

The address information obtaining unit 112 obtains address information that indicates the IP address set by the IP address setting unit 111 based on user input via the operation unit 11. In the embodiment, the input information includes a user identifier and an identifier for the guest PC 202, for example, but is not limited to these items of information.

Figure 4:
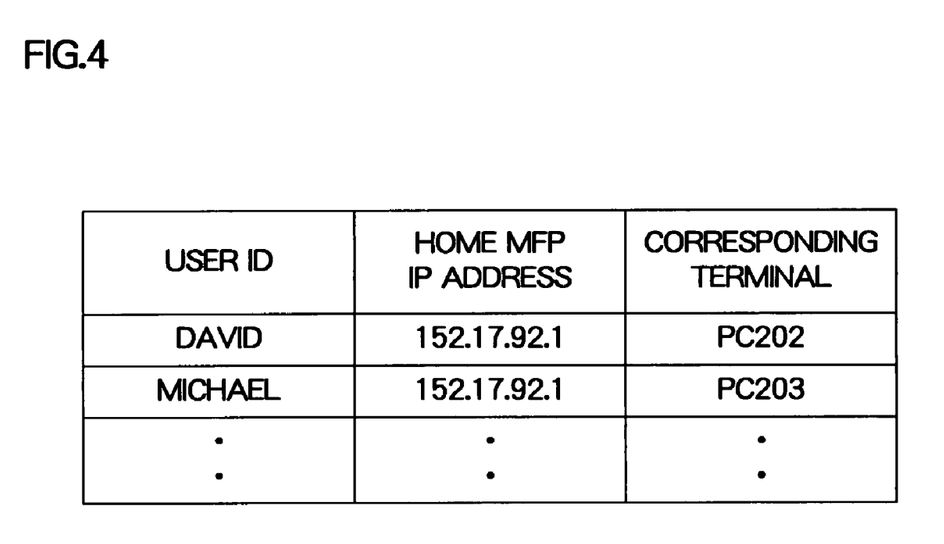
FIG. 4 is a drawing showing an example of the contents of the information stored in a network information storage unit 113.

The address information obtaining unit 112 reads out information from the address information storage unit 113 based on user input. FIG. 4 is a drawing showing an example of the contents of the address information stored in the address information storage unit 113.

In the embodiment, a home MFP is allocated to each user. Regarding the concept of a home MFP, see the patent application contained in Patent Application No. 2006-066660 submitted by the present applicant, for example. In the embodiment, the MFP 102 is allocated to users 'David' and 'Michael' as their home MFP.

In the embodiment, the IP address that can be used to build the one-to-one network to the guest PC 202 having a set IP address may be obtained from the information input from operation unit 11. In the example of FIG. 4, the IP address of the MFP 102 comprising the home MFP is obtained from the user, i.e., the PC, but an embodiment in which the network addresses of the internal LAN 502 (including subnets) are obtained may be used instead.

These items of information comprise information that indicates the IP address to be set by the IP address setting unit 111 in the second network interface 162. The contents of this information may vary depending on the type of information input via the operation unit 11.

The IP address setting unit 111 sets the IP address in the second network interface 162 based on information obtained by the address information obtaining unit 112. The set IP address can be set to be immediately adjacent to the IP address set in the terminal 202. (For example, where the IP address set in the guest PC 202 is '152.17.92.2' as shown in FIG. 1, the set IP address may be set to '152.17.92.1' or '152.17.92.3.')

The set IP address need not be immediately adjacent to that of the guest PC 202 IP address, and may comprise an IP address that can be used to build a second network comprising a one-to-one network with the guest PC 202. Therefore, it is acceptable if the IP address set in the guest PC 202 is identical to the network address, but the set IP address is different from the IP address fixed in the guest PC 202. In FIG. 4, the IP address of the home MFP was retained, but the network address (including subnet information) of the LAN to which the home MFP is connected may also be retained, as described above. Because the second network is a separate network that is located apart from the internal LAN 502, the IP address set in the second network interface 162 may be identical to the IP address of a device connected to the LAN 502 (such as the MFP 102).

The second network building unit 114 performs processing such that a one-to-one second network is built between the second network interface 162 and the guest PC 202 while the IP address is set in the second network interface 162. The second network building unit 114 detects that the second network is built between the second network interface 162 and the guest PC 202 and after the second network is built, performs control to ensure that IP packets sent from the guest PC 202 to the second network interface 162 are forwarded to the IP header editing unit 115.

The IP header editing unit 115 edits the headers of IP packets sent from the guest PC 202 where necessary. Because the internal settings of the guest PC 202 are not changed where it is connected to the MFP 101 at the remote location, if access to the MFP 102, for example, is attempted, the source address of IP packets sent from the guest PC 202 becomes (152.17.92.2) and the destination address becomes (152.17.92.1) shown in FIG. 1.

Where a VPN is built in the WAN 505, for example, the IP header editing unit 115 includes a part that encapsulates packets from the guest PC 202, and in this case, it adds an encapsulated header showing the MFP 102 as the destination. Where encapsulation is not performed, if the accessed device is the MFP 102, it is not necessary to edit the destination and source addresses, but if the accessed device is the PC 203, for example, it retracts the IP address of the PC 203 to another area of the packet and changes the packet destination to the IP address of the MFP 102.

The IP header editing unit 115 sets the flag indicating that [the packet] traveled through the second network interface 162 (in the embodiment, the 'remote location flag', for example) in a prescribed area of the packet. This remote location flag can be set where encapsulation is carried out as well.

The IP header editing unit 115 sends the IP packet edited in this fashion to the first network interface 161. The received IP packet is sent from the first network interface 161 to the remote LAN 501. As described above, IP packets in which the address of the MFP 102 is set as the destination address are sent to the MFP 102 via the remote LAN 501 and the WAN 505. The sequence of operations of the processing carried out on the MFP 102 differs slightly depending on whether or not an encapsulated header is added.

For example, on the MFP 102 that receives an encapsulated packet, the encapsulated header must be deleted. In this situation, it is preferred that the response to this packet also be encapsulated, and the destination in such a case is the MFP 101. This is because if a packet is sent with the guest PC 202 as the destination IP address, the packet does not reach the guest PC 202 connected to the remote location MFP 101 in the system construction of the embodiment. Responses to packets that are not encapsulated and in which the remote location flag is set must also be packets having the MFP 101 as the destination even though the response is not encapsulated.

The terminal 202 and the second network interface 162 may be connected by a crossover cable, as described above, but a straight-through cable may be used instead. The type of cable may be based on the wiring to the connector of the MFP 101. Furthermore, the connection between the two is not limited to a wired connection, and a wireless network may be built.

(3) Operation Sequence of Processing Executed on MFP 101 and MFP 102

Figure 5:
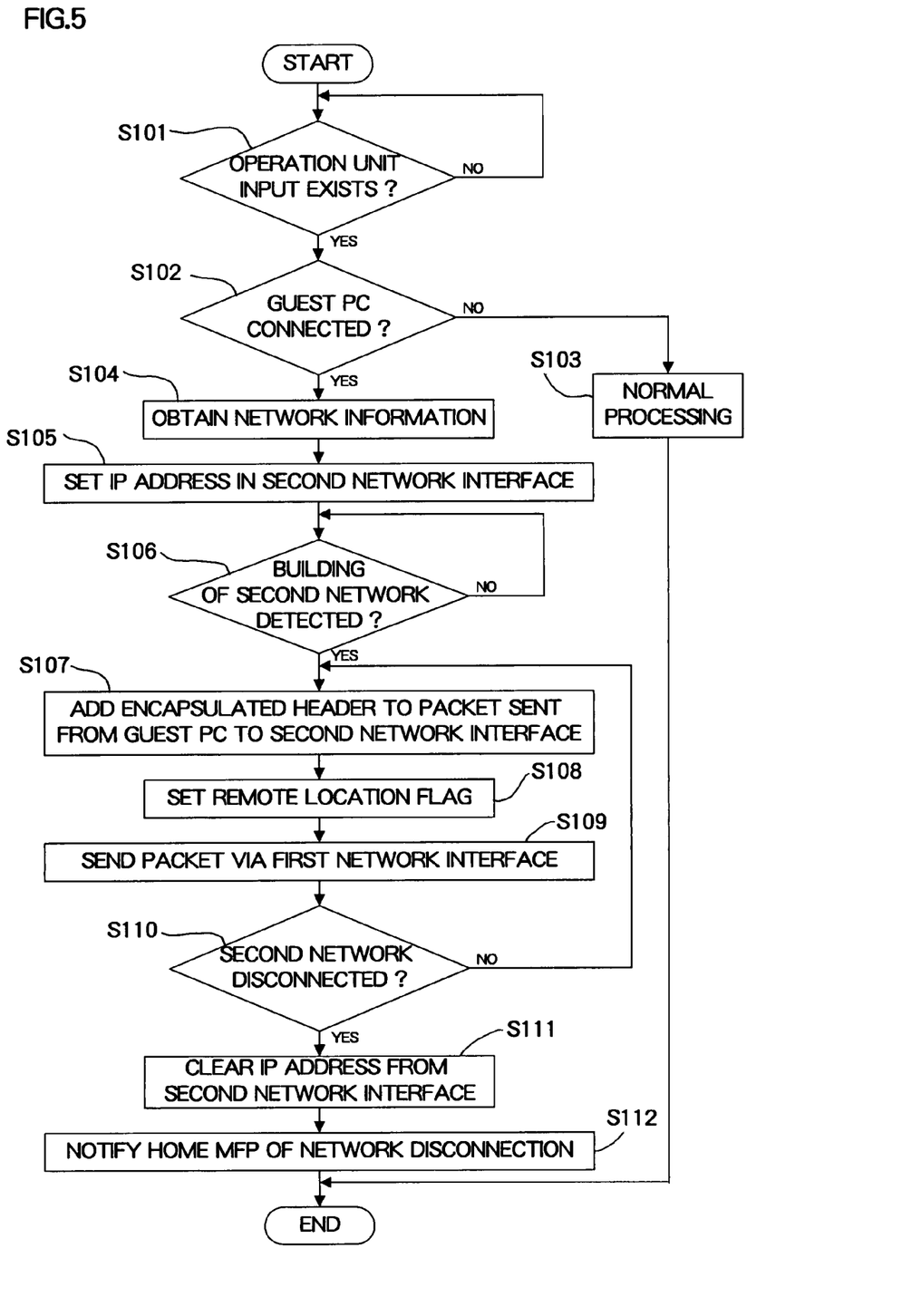
FIG. 5 is a flow chart showing the sequence of operations of the processing performed by an MFP 101.

The sequence of operations of the processing executed on the MFP 101 and the MFP 102 will now be described. FIG. 5 is a flow chart showing an example of the processing executed by the MFP 101. This processing is implemented on the MFP 101 via the execution by the CPU 20 of programs stored in the ROM 21.

If prescribed input is carried out from the operation unit 11 (such as user ID, guest PC ID, etc.) (S101: YES), the MFP 101 determines whether or not a guest PC is connected to the second network interface 162 (S102).

If a guest PC is not connected (S102: NO), normal processing is carried out in accordance with the input to the operation unit 11 (S103). If a guest PC is connected (S102: YES), the address information shown in FIG. 4 is obtained (S104). This address information may be preset and stored in the address information storage unit 113 or may be obtained from an external device via the remote LAN 501, the WAN 505 or the like.

Once the address information is obtained, the second network building unit 114 sets the IP address in the second network interface 162 (S105). The IP address set here is the IP address that will enable the building of a one-to-one second network between the second network interface 162 and the guest PC 202.

When it is detected that a second network is built (S106: YES), in the embodiment, the IP packet path is thereafter switched such that all IP packets sent from the guest PC 202 connected to the second network interface 162 are sent to the remote LAN 501 via the first network interface 161.

In other words, in the embodiment, a header that encapsulates the IP packets sent from the guest PC 202 to the second network interface 162 is added to each such IP packet (the destination of the added header is the IP address of the MFP 102), and the remote location flag is set (S108).

The IP packet is then sent from the first network interface 161 (S109). The destination of the sent packet is the MFP 102, and as a result, the MFP 102 can be accessed from the guest PC 202 brought to the remote location. If the destination of the packet from the guest PC 202 is the PC 203, for example, the packet is sent to the PC 203 via the MFP 102.

If the second network built between the guest PC 202 and the second network interface 162 is down (S110: YES), the IP address set in the second network interface 162 is cleared (S111). In the embodiment, the fact of the connection being down is sent to the home MFP (here, the MFP 102) in such a situation (S112).

Figure 6:
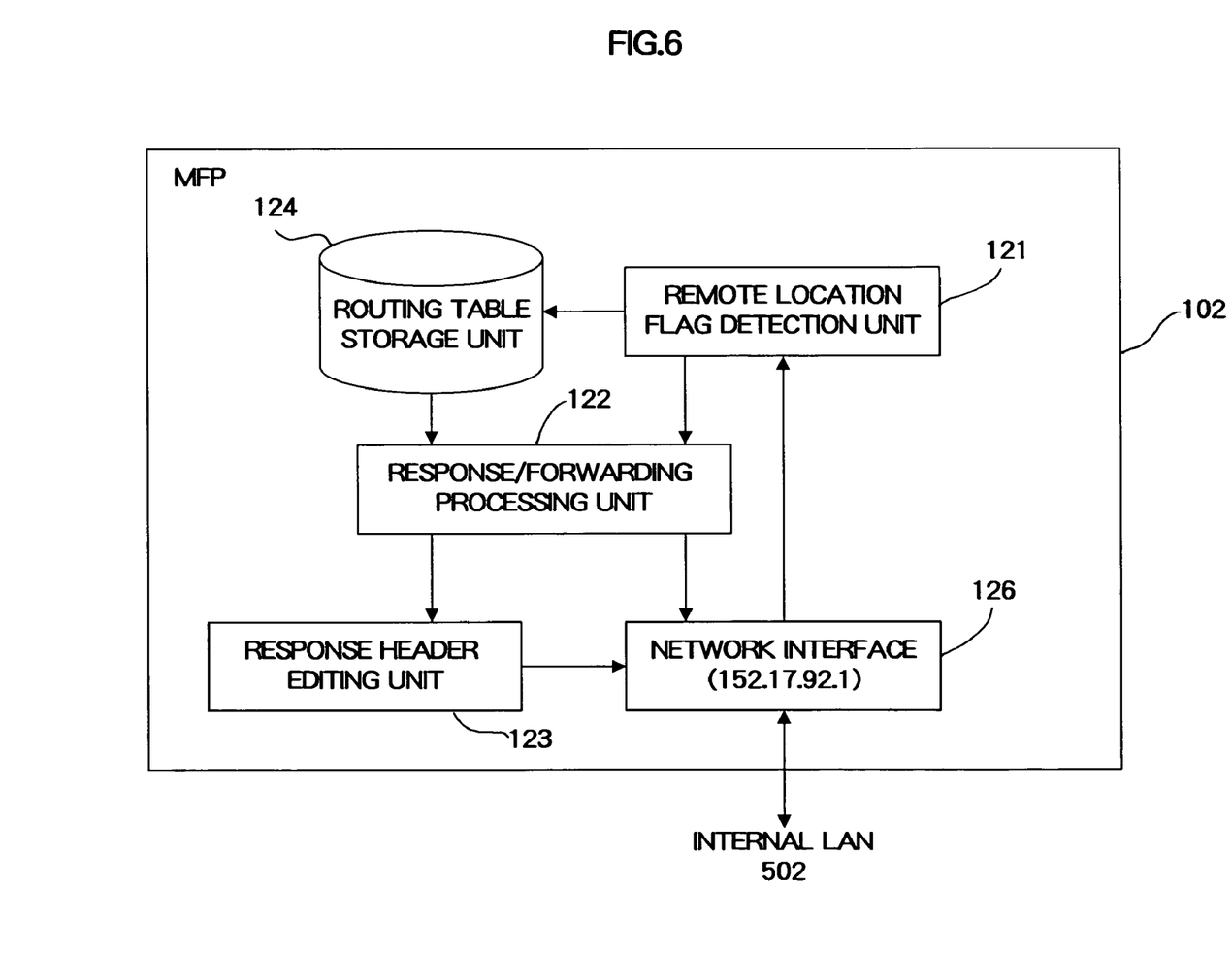
FIG. 6 is a function block diagram showing the construction of an MFP 102.

The processing executed on the MFP 102 that receives IP packets sent as described above will now be described. FIG. 6 is a function block diagram describing an example of the construction of the MFP 102.

The MFP 102 includes a remote location flag detection unit 121, a response/forwarding processing unit 122, a response header editing unit 123 and a routing table storage unit 124. The MFP 102 otherwise has the same hardware construction as the MFP 101 shown in FIG. 2, and the network interface 126 shown in FIG. 6 is identical to the first network interface 161 of the MFP 101. The remote location flag detection unit 121, response/forwarding processing unit 122 and response header editing unit 123 are implemented via the execution by the CPU incorporated in the MFP 102 of programs stored in ROM (not shown).

The remote location flag detection unit 121 determines whether or not the remote location flag is set in the IP packets received by the network interface 126 from the internal LAN 502. The response/forwarding processing unit 122 is the part that, regardless of whether or not the remote location flag is set, responds to the IP packets received and forwards packets to a different terminal in the internal LAN 502, such as the PC 203.

Where a response is to be issued to an IP packet in which the remote location flag is set, in the embodiment, the response header editing unit 123 edits the IP header to make the response packet destination the MFP 101. Where a VPN is built over the WAN 505, the IP header editing method can involve adding an encapsulated header, but where encapsulation is not performed, it is acceptable if the packet destination is rewritten and the original destination is retracted.

Figure 7:
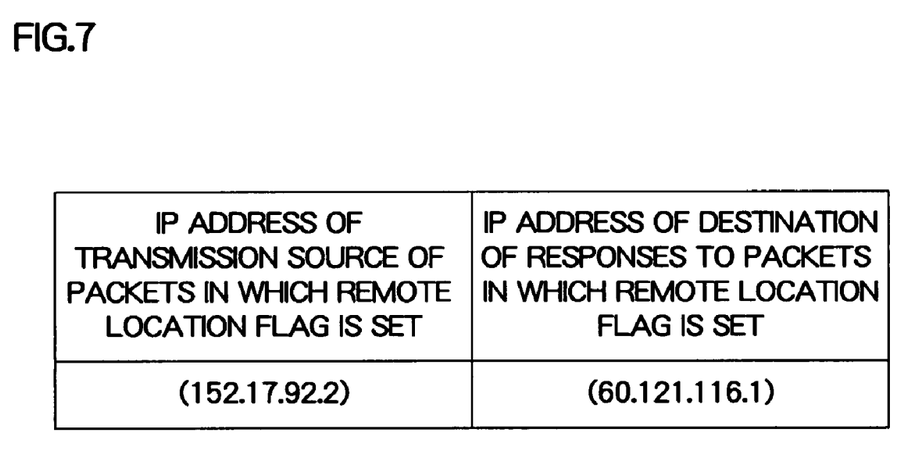
FIG. 7 is a drawing showing an example of the information stored in a routing table storage unit 124.

The correspondence between IP addresses of the transmission sources of packets for which the remote location flag is set (e.g., the PC 202) and the IP addresses to be set as the transmission destination for packets responding to the packets from each transmission source (here, the IP address of the MFP 101) is stored in the routing table storage unit 124. FIG. 7 is a drawing showing an example of information stored in the routing table storage unit 124.

Figure 8:
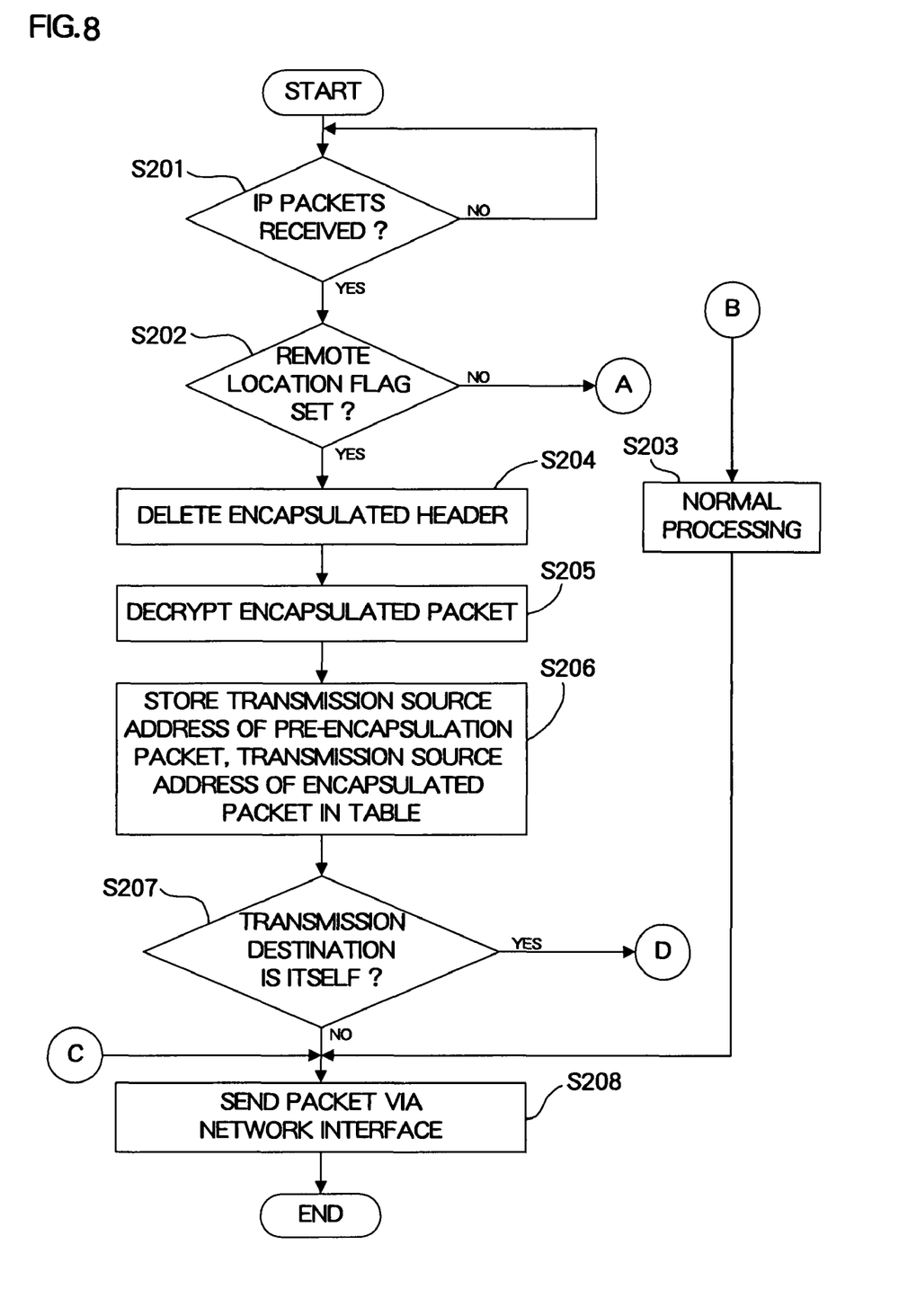
FIG. 8 is a flow chart showing the sequence of operations of the processing performed by the MFP 102.

FIG. 8 is a flow chart describing an example of the sequence of operations of the processing executed by the MFP 102. In the MFP 102, this processing is executed via the execution of programs stored in ROM (not shown) by the CPU of the MFP 102. Where an IP packet is received by the MFP 102 (S201: YES) and the remote location flag is not set therein (S202: NO), the MFP 102 advances to the processing shown in FIG. 9. While the setting of the remote location flag is checked in the embodiment, when a VPN is built on the WAN 505, an embodiment may be adopted in which the same processing as when the remote location flag is set is carried out in the case of packets traveling via the VPN.

Figure 9:
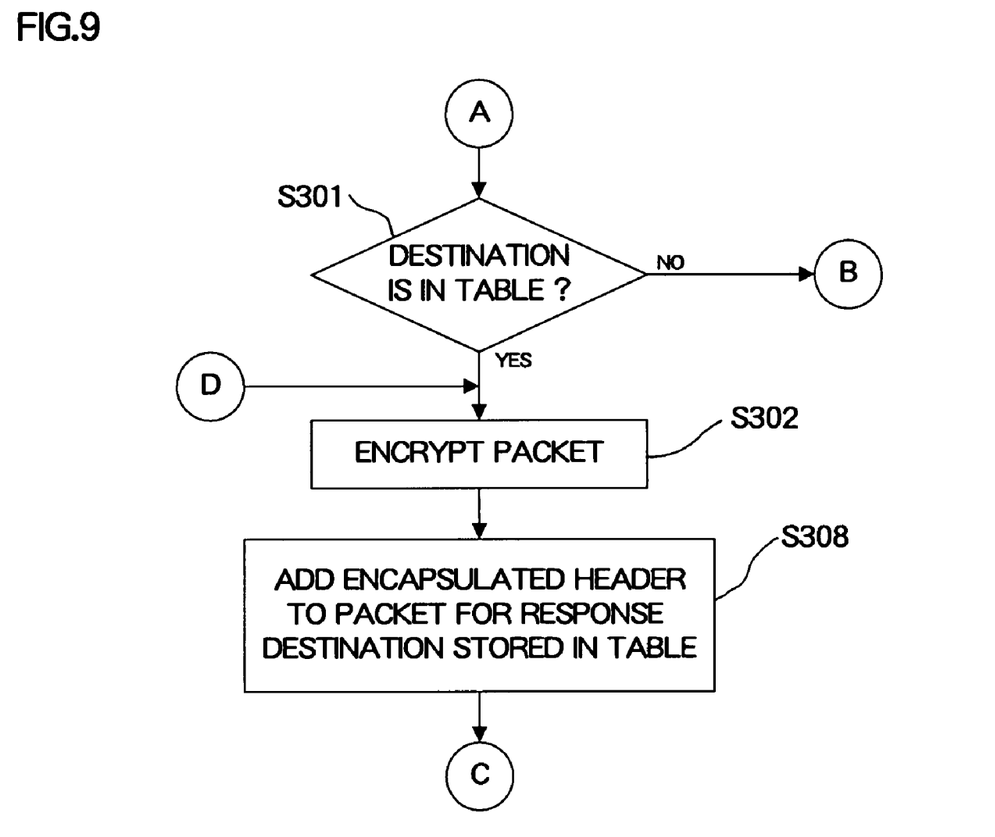
FIG. 9 is a flow chart showing the sequence of operations of the processing performed by the MFP 102.

In FIG. 9, it is determined whether or not the destination is stored in the routing table storage unit 124 (S301). Specifically, it is determined whether or not the received packet destination IP address matches the address stored in the left side of the table shown in FIG. 7. If it is determined that they match, it can be determined in the embodiment that the packet comprises a response to a packet sent from the remote LAN 501 in which the remote location flag is set.

If the destination is stored in the table (S301: YES), in the embodiment, the packet is encrypted (S302) and an encapsulated header is added thereto (S303). The destination of the encapsulated header is the IP address on the right side of the table shown in FIG. 7 (i.e., the MFP 101 in the embodiment).

Returning to the flow chart of FIG. 8, the packet is then sent from the network interface 126 (S208). If the destination is not in the table in step S301 of FIG. 9 (S301: NO), the MFP 102 returns to FIG. 8, executes normal processing (S203) and sends a response packet via the network interface 126 (S208).

The processing carried out where the remote location flag is set in the received packet in FIG. 8 (S202: YES) will be described below. In the embodiment, it is assumed that a VPN is built and that the packet is encapsulated. The MFP 102 deletes the encapsulated header (S204) and decrypts the encapsulated packet (S205). As a result of this decryption, the packet sent from the guest PC 202 in the remote location to the MFP 101 (i.e., the packet prior to encapsulation) is restored.

In the embodiment, the source address specified in the pre-encapsulation packet (here, the address set in the guest PC 202) and the source address in the encapsulated packet (here, the address of the MFP 101) are stored in the routing table storage unit 124 (S206). The contents of this table are as shown in FIG. 7.

The MFP 102 then determines whether or not the transmission destination restored after the deletion of the encapsulated header is itself (i.e., the MFP 102) (S207). If it is not itself (S207: NO), the restored packet is sent via the network interface 126 (S208). As a result, a packet for which the transmission destination is the PC 203, for example, is sent to the PC 203.

If the transmission destination is itself (S207: YES), the MFP 102 encrypts the response packet (S302), adds an encapsulated header (S303), and sends the packet via the network interface 126 (S208), as shown in FIG. 9.

The MFP 101 at the remote location receiving the response packet performs processing to delete the encapsulated header and the like, for example, and where the final transmission destination is the guest PC 202, sends the decrypted packet to the guest PC 202 via the second network interface 162. Through these processing sequences, the home MFP 101 or the PC 203 can be remotely accessed easily from the remote location without having to change the settings of the guest PC 202. In addition, in the embodiment, the information in the routing table storage unit 124 is deleted when notification of step S112 in FIG. 5 is received.

According to the network system pertaining to the embodiment, remote access can be performed easily from a remote location without installing new software in the [accessing] terminal.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, an MFP was used as the image processing apparatus, but the image processing apparatus of the present invention is not limited to an MFP, and may comprise a networkable copier or printer or other image processing apparatus.

What is claimed is:

1. A network system comprising a first image processing apparatus connected to a first network and a second image processing apparatus connected to a second network having a network address different from that of the first network, wherein the first image processing apparatus includes:
a first network device connected to the first network;
a second network device that builds a third network, that is different from the first and second networks, between the first image processing apparatus and a terminal that is connected to the second network, and in the terminal a first IP address in the second network is set;
an IP address setting unit that sets in the second network device a second IP address that is different from the first IP address;
an IP header editing unit that performs processing to make a destination of IP packets sent from the terminal via the third network an IP address of the second image processing apparatus; and
a packet transmission unit that sends the IP packets processed by the IP header editing unit to a network via the first network device, and the second image processing apparatus includes a response header editing unit that performs processing to make the first network device the destination for responses to IP packets sent by the terminal via the first image processing apparatus.

2. The network system according to claim 1, wherein the IP header editing unit adds to the IP packets a header making the second image processing apparatus the destination.

3. The network system according to claim 2, wherein the IP header editing unit encapsulates the IP packets.

4. The network system according to claim 1, wherein the second IP address comprises the same network address as the first IP address.

5. The network system according to claim 1, further comprising a path switching unit that switches the IP packet path so that after the third network is built, the IP packets sent to the second network device from the terminal are sent from the first network device via the IP header editing unit.

6. The network system according to claim 1, wherein when an IP packet is received from the second image processing apparatus, the IP header editing unit deletes any IP header in which the IP packet destination is the IP address of the first image processing apparatus, and when the IP packet in which the IP header was deleted is an IP packet for which the terminal is the destination, forwards the IP packet to the terminal via the second network device.

7. The network system according to claim 1, further comprising an input receiving unit that receives input of address information indicating the second IP address, wherein the IP address setting unit sets the second IP address based on the input address information.

8. An image processing apparatus that, where it is connected to a first network, can communicate with a second image processing apparatus connected to a second network that has a network address that is different from that of the first network, comprising:
a first network device connected to the first network;
a second network device that builds a third network, that is different from the first and second networks, between the image processing apparatus and a terminal that is connected to the second network and in the terminal a first IP address in the second network is set;
an IP address setting unit that sets in the second network device a second IP address that is different from the first IP address;
an IP header editing unit that performs processing to make a destination of IP packets sent from the terminal via the third network an IP address of the second image processing apparatus; and
a packet transmission unit that sends the IP packets processed by the IP header editing unit to a network via the first network device.

9. The image processing apparatus according to claim 8, wherein the IP header editing unit adds to the IP packets a header making the second image processing apparatus the destination.

10. The image processing apparatus according to claim 9, wherein the IP header editing unit encapsulates the IP packets.

11. The image processing apparatus according to claim 8, wherein the second IP address comprises the same network address as the first IP address.

12. The image processing apparatus according to claim 8, further comprising a path switching unit that switches the IP packet path so that after the third network is built, the IP packets sent to the second network device from the terminal are sent from the first network device via the IP header editing unit.

13. The image processing apparatus according to claim 8, wherein when an IP packet is received from the second image processing apparatus, the IP header editing unit deletes any IP header in which the IP packet destination is the IP address of the image processing apparatus, and when the IP packet in which the IP header was deleted is an IP packet for which the terminal is the destination, forwards the IP packet to the terminal via the second network device.

14. The image processing apparatus according to claim 8, further comprising an input receiving unit that receives input of address information indicating the second IP address, wherein the IP address setting unit sets the second IP address based on the input address information.

15. A network building method implemented in a network system comprising a first image processing apparatus connected to a first network and a second image processing apparatus connected to a second network having a network address different from that of the first network, wherein the first image processing apparatus includes a first network device connected to the first network and a second network device that builds a third network, that is different from the first and second networks, between the image processing apparatus and a terminal that is connected to the second network and in the terminal a first IP address in the second network is set, said network building method comprising:
setting a second IP address different from the first IP address in the second network device;
performing processing that makes an address of IP packets sent from the terminal via the third network an IP address of the second image processing apparatus;
sending the processed IP packets to a network via the first network device; and
performing processing to make the first network device the destination for responses to IP packets sent by the terminal via the first image processing apparatus.

16. A nontransitory computer-readable medium on which is encoded a software program that causes a computer to execute processing, wherein the computer is included in a first image processing apparatus that, where the first image processing apparatus is connected to a first network, can communicate with a second image processing apparatus connected to a second network having a network address different from that of the first network address, and the first image processing apparatus includes a first network device connected to the first network and a second network device that builds a third network, that is different from the first and second networks, between the first image processing apparatus and a terminal that is connected to the second network and in which the first IP address in the second network is set, said processing comprising:
setting a second IP address different from the first IP address in the second network device;
performing processing such that an address of IP packets sent from the terminal via the third network is an IP address of the second image processing apparatus; and
sending the processed IP packets to a network via the first network device.

* * * * *